United States Patent [19]

Karol

[11] 4,330,803
[45] May 18, 1982

[54] DISK ACCESSING APPARATUS AND METHOD

[75] Inventor: Kenneth N. Karol, Tucson, Ariz.

[73] Assignee: International Business Machines Corporation, Armonk, N.Y.

[21] Appl. No.: 64,274

[22] Filed: Aug. 6, 1979

[51] Int. Cl.³ .................... G11B 5/82; G11B 25/04
[52] U.S. Cl. .................................... 360/99; 360/98; 360/133
[58] Field of Search ........................... 360/97–99, 360/133, 135, 105, 137, 86

[56] References Cited

U.S. PATENT DOCUMENTS

| | | | |
|---|---|---|---|
| 3,994,017 | 11/1976 | Barkhuff et al. | 360/98 |
| 4,118,746 | 10/1978 | Gyi et al. | 360/99 |
| 4,134,143 | 1/1979 | Ragle et al. | 360/133 |
| 4,143,408 | 3/1979 | McGinnis et al. | 360/99 |
| 4,149,207 | 4/1979 | Porter Jr. et al. | 360/99 X |
| 4,167,029 | 9/1979 | Ragle et al. | 360/99 |
| 4,191,981 | 3/1980 | Van Winkle | 360/99 |
| 4,214,286 | 7/1980 | Ragle et al. | 360/99 |
| 4,237,503 | 12/1980 | Ragle | 360/98 X |

Primary Examiner—John H. Wolff
Attorney, Agent, or Firm—Herbert F. Somermeyer

[57] ABSTRACT

A disk accessing apparatus and method are disclosed for creating an axial spacing between two adjacent disks of a rotating disk stack. The accessing apparatus is mechanical and operates from one end of the stack of disks with one portion of the apparatus being movable axially with respect to the stack of disks and received within central apertures of the disks to contact at least one disk thereat and move the contacted disk axially away from an adjacent disk to create a transducer access opening therebetween. The apparatus can have a variety of configurations including utilization of axially displaceable disk engaging tumblers and/or pins axially movable through apertures or offsets at the central portion of the disks, fingers axially movable to engage disk tabs within the central apertures of the disks, and/or disk actuating, rotatable screw threaded shafts. Latching mechanisms are also disclosed to lock the apparatus to maintain a transducer access opening then established, and a self-centering disk drive and support configuration is disclosed to maintain concentricity despite wear between contacting parts imparting rotation to the disks.

62 Claims, 30 Drawing Figures

DISK ACCESSING APPARATUS AND METHOD

This invention relates to a disk accessing apparatus and method and, more particularly, relates to an apparatus and method for creating an axial opening between disks of a rotating stack of disks in a record storage device.

BACKGROUND OF THE INVENTION

It is a well accepted practice, particularly in the computer industry, to record information on recording disks that are then commonly maintained closely confined in stacks for storage purposes. For retrieval of the information so recorded and stored, the particular disk having the needed information stored thereon is selected from the stack and a transducer is brought into contiguous relationship therewith, as is well known.

Various devices have heretofore been suggested and/or utilized for selecting or positioning a record disk for information recording/retrieval. While the disks included in a stack could be manually separated one from another until the needed disk is found and that disk then removed from the stack and brought to a transducer, this is most often too time consuming, as well as being frequently difficult and/or expensive to implement.

Devices have heretofore been suggested and/or utilized with mechanical parts for separating phonograph records, for example, by axially sliding the records using a central selector to hold one portion of the stack while the other portion is gravity fed to a turntable for rotation of a selected record thereat (see, for example, U.S. Pat. No. 2,960,340). Devices have also been heretofore suggested and/or utilized with mechanical parts for contacting disks at the central hub portion thereof and causing rotation of only the selected disk (see, for example, U.S. Pat. No. 3,229,269).

Systems for creating an axial spacing between adjacent disks of a stack of rotating disks to allow transducer access to a particular disk within the stack have also been suggested and/or utilized. Among such systems are devices wherein air is utilized at the periphery of the disks to create a space (see, for example, U.S. Pat. No. 3,130,393), devices wherein air is utilized at a co-rotating actuator to create a space between adjacent disks (see, for example, U.S. Pat. No. 4,011,591), and devices wherein mechanical means is utilized at the periphery and air centrally to create a space between adjacent disks (see, for example, U.S. Pat. No. 4,019,204).

In addition, air has heretofore been applied through the central hub portion of a stack of co-rotating disks to act in conjunction with rapid displacement of the endplates engaging the opposite sides of the stack to enlarge an axial opening between two adjacent disks sufficiently for transducer accessing (see, for example, U.S. Pat. No. 3,994,017).

SUMMARY OF THE INVENTION

This invention provides an improved disk accessing apparatus and method that creates an axial opening between adjacent disks in a stack of co-rotating disks by contacting the central hub portion of a disk and causing axial movement of that disk away from an adjacent disk sufficient for transducer access between the separated disks.

It is therefore an object of this invention to provide an improved disk accessing apparatus and method.

It is another object of this invention to provide an improved disk accessing apparatus and method for creating an axial opening between adjacent disks of a stack of rotating disks.

It is still another object of this invention to provide an improved disk accessing apparatus and method that includes mechanical means operable from one end of a rotating stack of disks to contact a selected disk at the central hub portion to cause that disk to be axially moved away from an adjacent disk to thereby create a transducer opening therebetween.

It is another object of this invention to provide an improved method that includes contacting a rotating disk at the central hub portion thereof and causing that disk to be moved in an axial direction away from an adjacent rotating disk to create a transducer opening therebetween.

It is yet another object of this invention to provide an improved latching mechanism for a disk accessing device.

It is still another object of this invention to provide an improved drive and support for maintaining concentricity despite wear between engaging surfaces imparting rotational drive to the disks.

BRIEF DESCRIPTION OF THE DRAWINGS

The above-mentioned and other features and objects of this invention and the manner of attaining them will become more apparent and the invention itself will best be understood with reference to the following description of embodiments of the invention taken in conjunction with the accompanying drawings, the description of which follows.

DESCRIPTION OF THE PREFERRED EMBODIMENT

Figure 1:
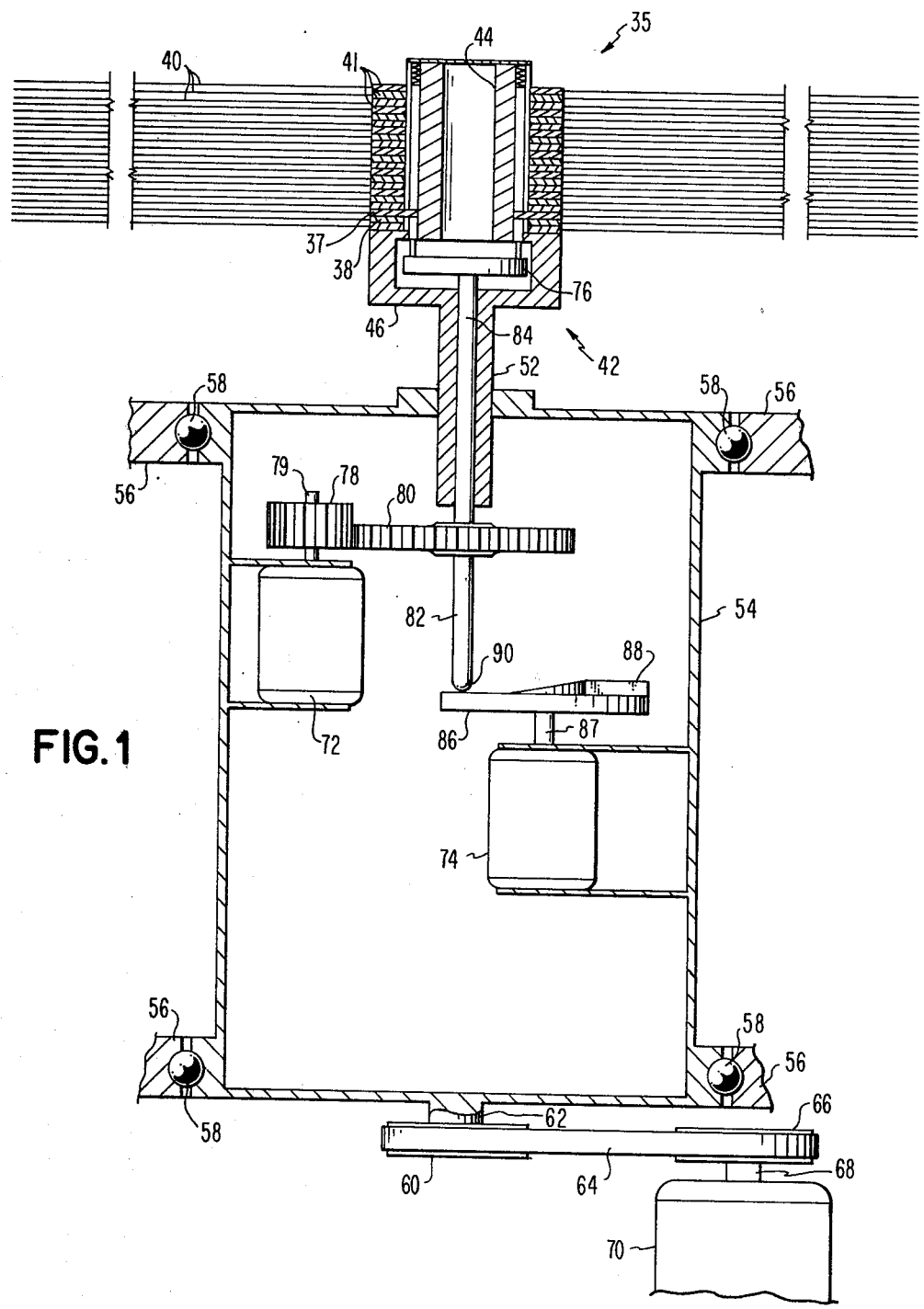
FIG. 1 is a cut-away side view of an apparatus that may be utilized to impart rotation to and create an axial opening between pre-selected rotating disks of a stack of disks.

Referring now to the drawings, a device 35 is shown in FIG. 1 for creating an axial spacing between any adjacent disks of a group, or stack, of disks (as, for example by creating an axial spacing between disks 37 and 38 of the stack of disks, which disks have been designated generally by the numeral 40). Disks 40 may be conventional flexible recording disks as described in U.S. Pat. No. 3,994,017. While not mandatory, it has been found preferable to provide a washer (designated generally by the number 41) attached to each disk at the central hub portion with both having a central aperture. Washers 41 have a greater thickness than do disks 40 so that the washers are rigid relative to the flexible disks.

As shown, accessing apparatus 42 is located one axial end of the stack of disks 40 which are commonly maintained coaxially positioned with respect to one another (preferably through the use of washers 41) on cylinder 44 with the stack in engagement with hub 46 at one side of the central portion of the disks. Although not shown, endplates may be provided at the opposite axial ends of the stack of disks. When so provided however, it is necessary that the endplates either be sufficiently spaced or be axially movable (as against tension, for example), to allow axial movement of the disks for transducer accessing as brought out hereinafter.

As shown in FIG. 1, all of the disks 40, are commonly rotatively driven through drive shaft 52 fixed to hub 46 and rotatable drive housing 54. Housing 54 is mounted for rotation on frame 56 by means of bearings 58 so that disks 40, hub 46, shaft 52 and housing 54 are constrained to common rotation.

Pulley 60 is mounted on shaft 62 which is fixed to disk housing 54 for common rotation therewith and shaft 62 is rotatively driven by means of belt 64 extending over pulley 60 and drive pulley 66, with pulley 66 being mounted on motor shaft 68 of motor 70.

Motors 72 and 74 are mounted within drive housing 54 for rotating and imparting axial movement to the accessing apparatus 42 to orient the selector, or contactor, 76, of the accessing apparatus and to move the selector between the open (accessing) and closed (non-accessing) functions, as brought out more fully hereinafter.

As shown in FIG. 1, motor 72 has a drive gear 78 mounted on motor shaft 79 to engage drive gear 80 fixed to stem 82 to control rotation of the stem. Stem 82 is received within shaft 52 and is freely rotatable with respect thereto with one end 84 of the stem being connected to selector 76 to thus control rotation of the selector and therefore orient the same as a control means of the selector 42.

Figure 4:
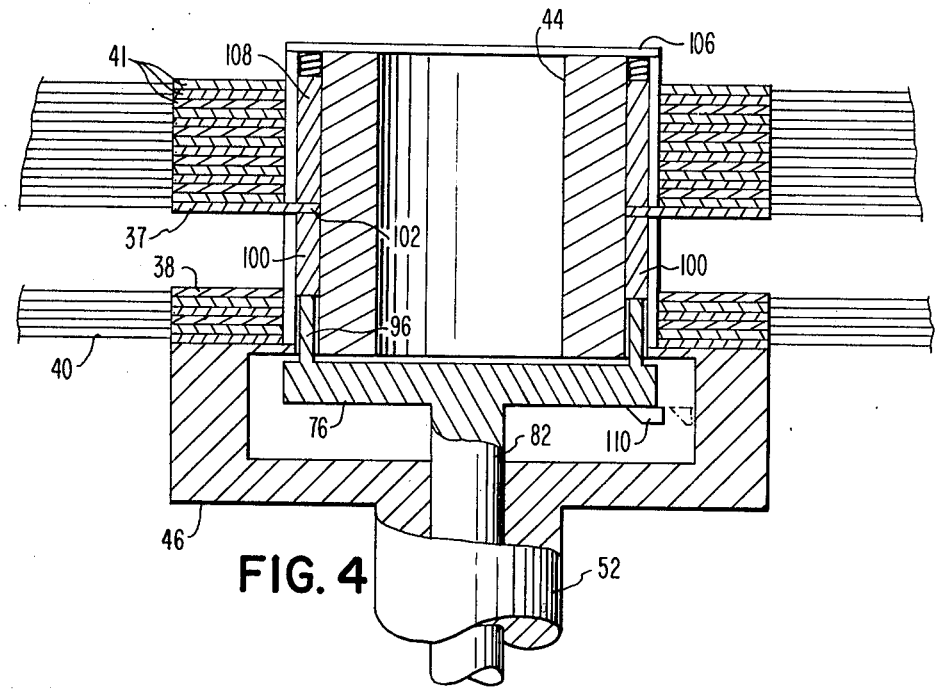
FIG. 4 is a partial cut-away side view illustrating typical disk separation utilizing apparatus as shown in FIGS. 1 through 3.

Motor 74 has a disk 86 mounted on motor shaft 87. The upper surface of the disk includes a cam surface 88 which engages the lower end 90 of stem 82 so that the stem is moved (upwardly and downwardly as indicated in FIG. 1) as motor 74 rotates disk 86 to bring the cam surface into and then out of engagement with the stem. As shown in FIG. 1, the stem is retracted to establish the closed position (i.e. non-accessing function of the device). When moved to the extended (open) position, (as shown by FIG. 4 by way of example), the accessing function of selector 76 is established by the just-described actuator means.

The drive mechanism shown in FIG. 1 is for illustrative purposes only, and it is to be realized that other driving mechanisms and/or portions thereof, might be utilized as would be obvious to one skilled in the art.

Figure 2:
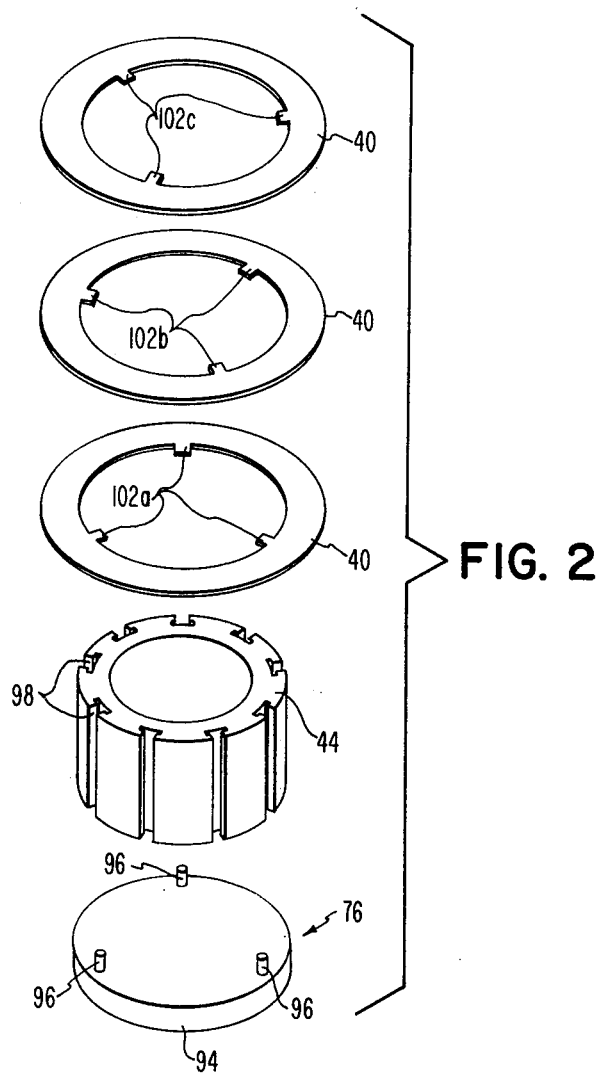
FIG. 2 is a partial exploded perspective view of one arrangement according to the invention for creating an axial opening between adjacent disks.
Figure 3:
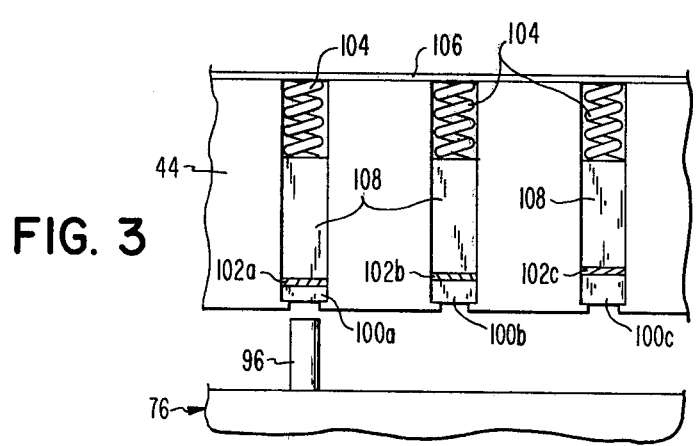
FIG. 3 is a straight-line partial side view of the arrangement as shown in FIG. 2 illustrating the use of tumblers to create an axial opening between predetermined disks.

A preferred embodiment of selector 76 and associated elements is shown in FIGS. 2 and 3. As shown in FIG. 2, selector 76 includes a disk 94 having pins 96 extending outwardly from one surface thereof (three pins are shown but any number might be utilized as desired for a particular use).

When selector 76 is moved to the open position, pins 96 are moved axially (with respect to the stack of disks) so that the pins are inserted into openings, or notches, 98 of cylinder 44. As shown in FIG. 3, each opening 98 in cylinder 44 preferably has a tumbler 100 therein for contact with pins 96.

As shown in FIG. 2, tabs 102 (designated as a, b, and c for different disks) extend inwardly into the central aperture, or hub, portion and are received in openings 98 in cylinder 44 (if washers 41 are utilized, then the more rigid washers, which are to be considered part of the disk when so utilized, have the tabs 102 thereon). As can best be appreciated from FIG. 2, the tabs are received in openings 98 so that the circumferential orientation of the selector controls which tabs are contracted and therefore controls which disks are axially moved by the axial insertion of pins 96 into openings 98.

The number of tabs for each disk normally equals the number of pins 96 on selector 76, and the number of openings 98 in cylinder 44 will normally be equal to the number of disks in the stack multiplied by the number of pins utilized. Thus, for a stack of ten disks and three pins utilized on the selector, there must be 30 openings, or notches, 98 in cylinder 44, and selector 76 must have 10 discreet rotational positions.

The arrangement of cylinder 44, as shown in FIG. 2, is shown in greater detail by the partial straight-line view illustrated in FIG. 3. This view better illustrates use of tumblers 100 of varying depths to accomodate a short pin stroke of pins 96. This enables use of pins of a length sufficient to extend into the cylinder only to the depth of the access opening desired between particular disks. As shown, tabs 102a, 102b and 102c are at different depths within cylinder 44 (since the tabs are on different disks).

As shown in FIG. 3, by way of example, selector 76 is positioned (i.e., oriented by rotation) to contact the disk with tabs 102a thereon when selector 76 is axially moved to translate pins 96 axially into the tumbler opening 98 to engage tumbler 100a (as opposed to tumbler 100b or 100c which are associated with the tabs 102b and 102c respectively). Continued movement of pins 96 axially will move tumblers 100a and hence move the contacted disk (with tabs 102a) axially (this would be disk 37 as indicated in FIG. 1) away from the adjacent disk (which is disk 38 as indicated in FIG. 1) to create a transducer access opening therebetween.

Tumblers 100 are biased in the direction opposite to pin insertion by means of springs 104 between endplate 106 and disk tumbler clamps 108 so that upon movement of pins 96 out of engagement with any tumbler 100, the tumbler will return to the normal closed position (i.e. with no access spacing between disks). In this embodiment pins 96 and items 100, 108 are included in a rod-means as a part of axial actuator means for axially moving a selected disk 40 to generate a transducer access spacing.

In FIG. 4, selector 76 is shown in the open position to create a typical transducer access spacing between disks 37 and 38. As shown, pins 96 of selector 76 are in contact with tumblers 100 to move disk 37 axially away from disk 38.

As also shown in FIG. 4, a latch, or blocking, mechanism 110 is preferably utilized to maintain selector 76 in the open position after a transducer access opening has been established and this assures that the transducer access opening selected will not be disrupted since retraction of the selector will not result in closing the transducer access opening until the latch mechanism is withdrawn. This creates a failsafe transducer access opening which prevents undesired access closing as could occur, for example, in the event of a power failure.

Figure 5:
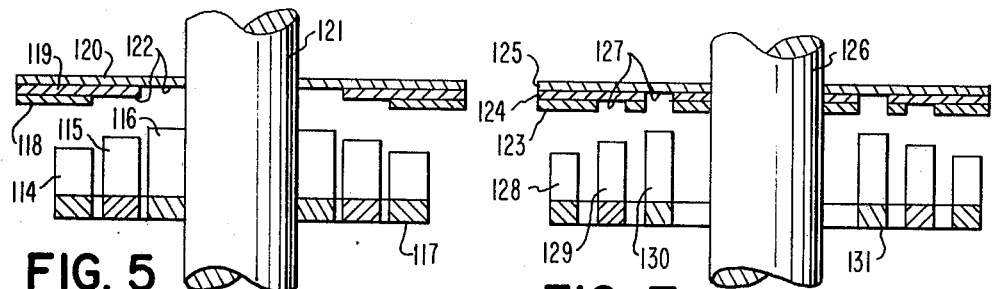
FIG. 5 is a partial side view showing an alternate embodiment of a selector for achieving disk separation.
Figure 6:
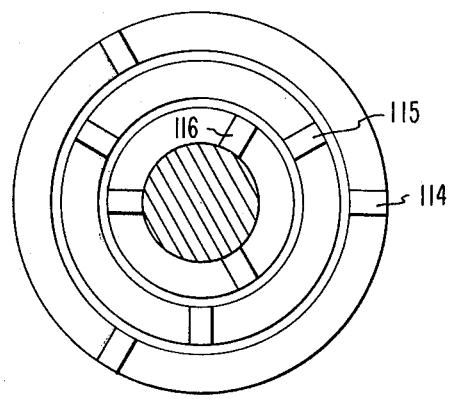
FIG. 6 is a partial top view illustrating the selector arrangement as shown in FIG. 5.

Alternate embodiments of the selector mechanism are shown in FIGS. 5 through 8. As shown in FIGS. 5 and 6, a plurality of rod means projections 114, 115, and 116 of different axial heights are utilized with such rod means projections being spaced radially outwardly with respect to one another and also being circumferentially offset with respect to one another. As shown, these projections are utilized in conjunction with disks 118, 119, and 120 on shaft 121 with the disks having different offsets (or different radius apertures) 122 for contact with the respective projections spaced in different circumferential rows (as indicated in FIG. 6).

Figure 7:
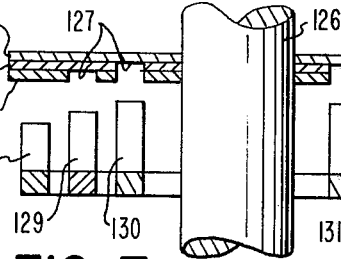
FIG. 7 is a partial side view showing a second alternate embodiment of a selector for achieving disk separation.
Figure 8:
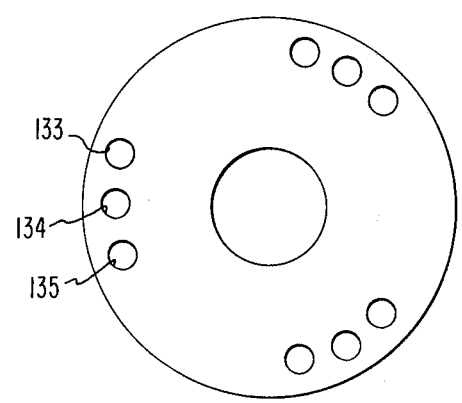
FIG. 8 is a partial top view illustrating a third alternate embodiment for achieving separation of disks.

FIG. 7 shows a plurality of disks 123, 124 and 125 on shaft 126 with the disks having spaced apertures (or keyholes) 127 through which a plurality of radially spaced rod means projections an axially extending pias 128, 129 and 130 of different axial heights extend for engagement with the desired disk. As indicated by FIG. 8, the projections may also be spaced sets that are circumferentially spaced with respect to one another to mate with circumferentially spaced sets of apertures (or keyholes) (not shown) in the associated disks.

A latching mechanism 138 (to implement latch 110 as shown in FIG. 4) is shown in FIGS. 9 through 12. This mechanism can be utilized to enable selection of a disk, after which the selector may be retracted and thus freed for movement to a new position for subsequent selection of another disk for accessing, all without adversely affecting the then established access spacing between disks.

Figure 9:
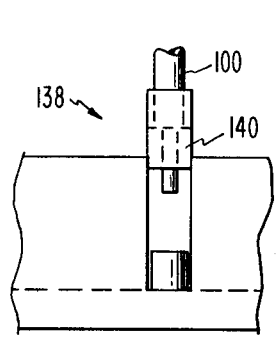
FIG. 9 is a partial end view illustrating a latching device for latching the selector in a transducer accessing position.
Figure 10:
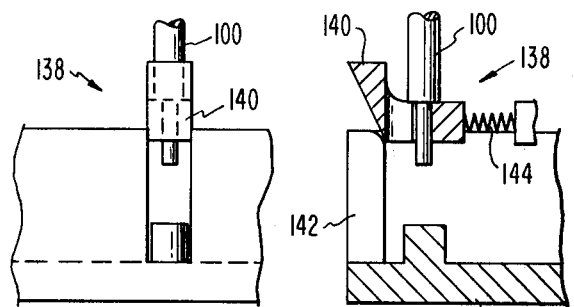
FIGS. 10 and 11 are partial side views of the latching device as shown in FIG. 9 illustrating the latching device in the open and closed positions, respectively.
Figure 11:
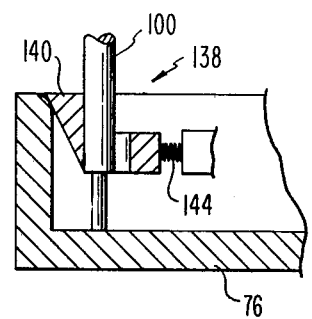
Figure 12:
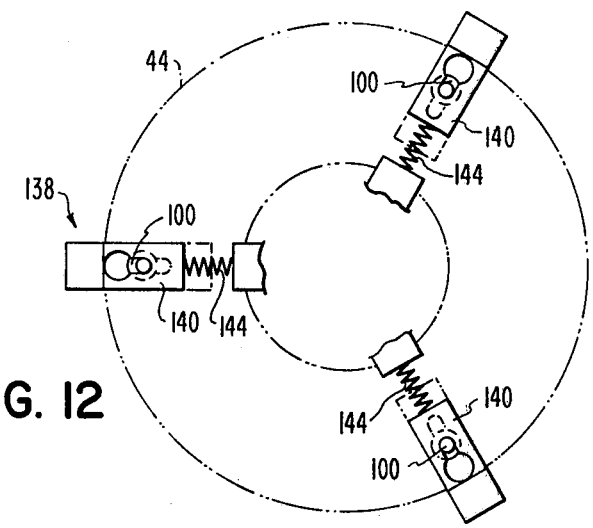
FIG. 12 is a partial top view illustrating the latching device shown in FIGS. 9 through 11 used with a three pin selector.

Latch mechanism 138, as shown in FIGS. 9 through 12, includes a movable latch 140 engagable with tumbler 100 to lock the tumbler in the closed position (i.e., establishing a transducer access opening). A delatch plate 142 is provided below latch 140 to control actuation of the latch. FIG. 10 shows the device with a disk selected and with the latch mechanism in the latched position with latch 140 engaging tumbler 100 to maintain the access spacing between disks even though selector 76 is withdrawn from the tumbler (as indicated in FIG. 10). This is in contrast to the unlatched position, as shown in FIG. 11, in which the latch is withdrawn to the delatched position and tumbler 100 is in the closed position with no transducer access opening established. FIG. 12 shows a top view of the latching mechanism as shown in FIGS. 9 through 11 illustrating use of the latching mechanism with a selector having three pins, or keys, and the tumblers received in cylinder 44. As shown in FIG. 12, the mechanism is in the latched position with biasing spring 144 extended (as opposed to compressed when in the unselected delatched position as indicated in FIG. 11).

Figure 14:
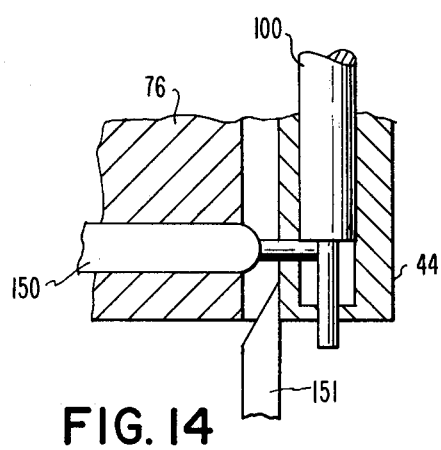
FIGS. 13 and 14 are partial side views illustrating a second embodiment of a latching device with the device in the latch and unlatched positions, respectively.
Figure 13:
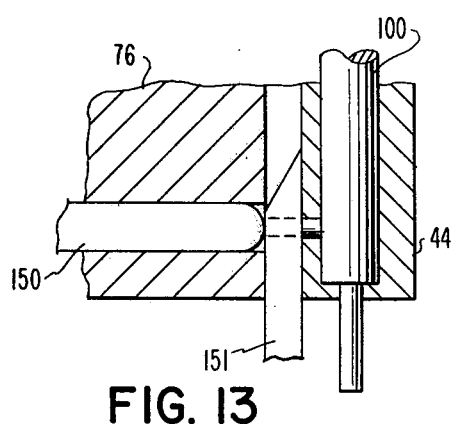

A latching mechanism 146 utilizing less space as shown in FIGS. 13 and 14. As shown in FIG. 13, tumbler 100 in cylinder 44 is in the deselect, or closed, position. Latch 150 in selector 76 is withdrawn in this position to allow the tumbler to attain the deselect position, and delatch pin 151 is shown engaged. As shown in FIG. 14, tumbler 100 is in the select, or open, position with delatch pin 151 withdrawn. As shown, latch 150 is engaged to maintain the tumbler in the select position. Latch 150 may be spring biased (not shown) toward the engaged position.

Figure 15:
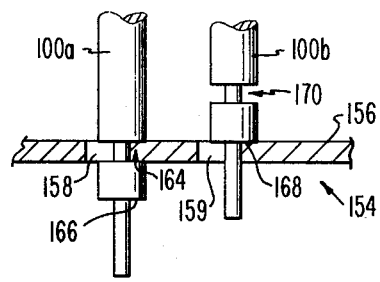
FIGS. 15 through 20 illustrate by partial side and top views a third alternate embodiment of a latching device for use with multiple pins and a single latch plate.

A latch mechanism 154, that is a one piece latch for use with a rotary motion type selector with multiple tumblers, is shown in FIGS. 15 through 20. As shown for illustrative purposes, a single piece latch plate 156 has apertures, or tumbler catch holes, 158 and 159 therein for receiving tumblers 100a and 100b. As shown in FIG. 15 the plate is positioned so that tumbler pin 100a is offset from aperture 158 and hence is locked in notch 164 therein above recess 166 (this recess or "notch" establishes a deselected position). Tumbler pin 100b is also offset from aperture 159 in latch plate 156 but has recess (notch) 168 (below notch 170) engaging the side wall of aperture 159 (this establishes the select position).

Figure 16:
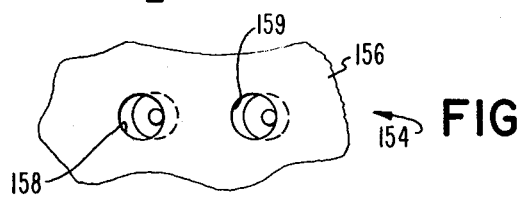
Figure 17:
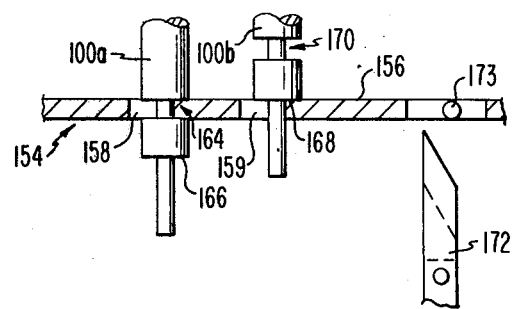

As shown in FIG. 17, latch plate actuator pawl 172 (mounted on selector 76 not shown) is withdrawn from latch plate 156 at this time to permit the latch plate to assume the position as shown in FIGS. 15 through 17. Latch plate 156 can be spring biased (not shown) toward the position as depicted in FIGS. 15 through 17.

Figure 18:
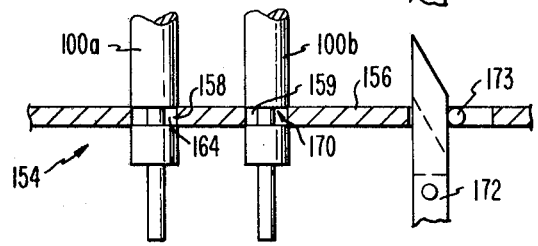
Figure 19:
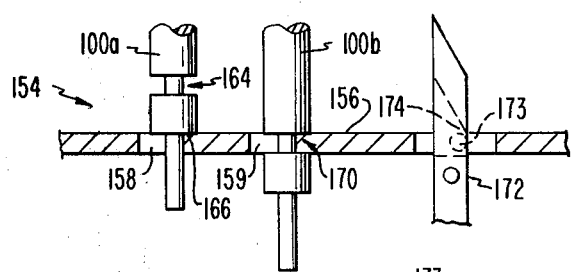
Figure 20:
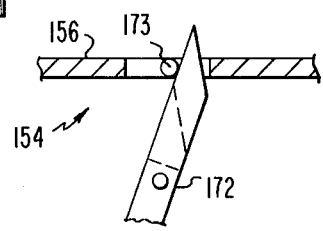

When the latch plate 156 is moved axially to center the tumbler pins 100a and 100b, the pins are free to move to the select or deselect positions (as shown in FIG. 18). At this point, the latch plate actuator pawl 172 has been moved into contact with latch plate pin 173 to cause movement of the latch plate to the position as shown in FIG. 18. Latch plate actuator pawl 172 has a relief notch 174 therein which allows the latch plate to again move axially to return latch plate 156 to the offset position of the apertures with respect to the tumbler pins as selector 76 continues to rotate. If the pins are then as illustrated in FIG. 19, tumbler pin 100a is in the select position, while tumbler pin 100b is in the deselect position. As is indicated in FIG. 20, as selector 76 continues to rotate, actuator plate pawl 172 is withdrawn but the latch plate will be maintained in position to maintain the tumbler pins locked in the same positions.

Figure 21:
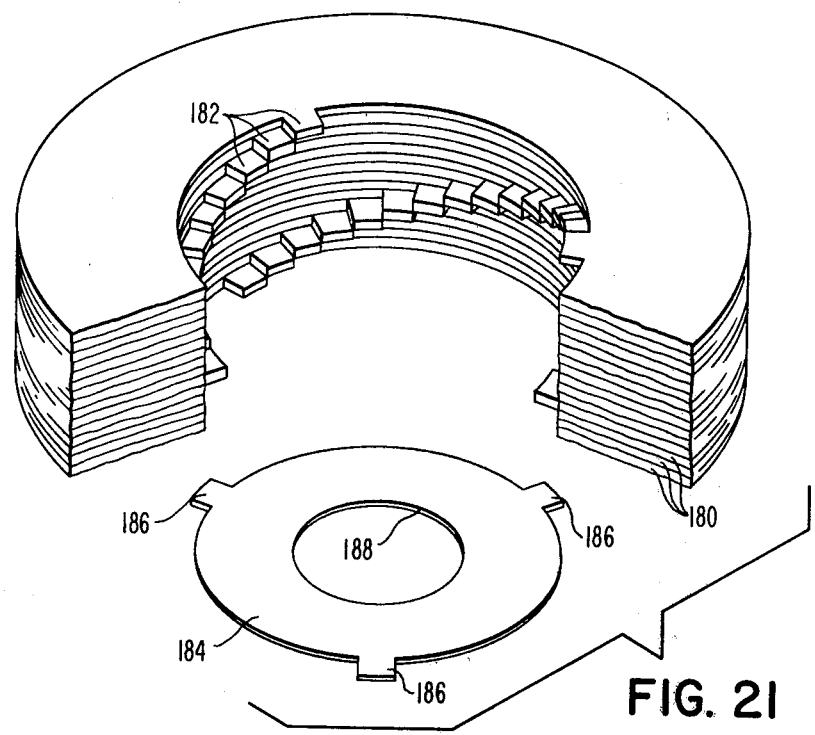
FIG. 21 is a partial perspective view illustrating another alternate embodiment of a selector with tabs engageable with disk tabs in a helix configuration in the disk central apertures.

Another alternate embodiment of the selector device is shown in FIG. 21. In this embodiment, each disk 180 has an inwardly directed tab 182 thereon with the tabs extending into the central apertures in the disks. As can be appreciated from FIG. 21, each tab is angularly or circumferentially offset from each adjacent tab to form a helix configuration within the central aperture. By forming a helix configuration for each group of the tabs (the number of groups correspond to the number of fingers to be utilized by the selector) with each extending partially around the inner surface of the central aperture (for example by the use of three groups as indicated in FIG. 21), a flat selector 184 with three outwardly extending rod means fingers, or ears 186 can be utilized with the selector being axially movable within the central aperture to contact predetermined tabs on each disk depending on the orientation (i.e., rotational or control position) of the selector with respect to the disks. Continued contact and axial movement of selector 184 actuates the selected disk to move axially for creating a transducer access spacing. In this configuration, the selector may be mounted within the central aperture and hence be internal.

Although shown as tabs, or ears, 186, the tabs on the selector could be formed into continuous helices, as is a threaded shaft, for example. With the selector 184, as shown in FIG. 21, three tabs 182 would be selected at any one time and engaged by ears 186 of the selector, although the configuration of tabs and/or selector can be varied as might be needed or desired for a particular application.

The selector shown in FIG. 21 can be axially and rotatively positioned by means of a threaded shaft (not shown). When so utilized, the central aperture 188 of selector 182 has the threaded shaft received therein. Axial movement is then imparted to the shaft until the desired tabs are engaged (this will also require rotational movement of the selector until an orientation is achieved that will engage the desired tabs 182 on the disk 180 to be selected). Rotation of the shaft while maintaining the selected rotational position of the selector will then cause the selected disk to be axially moved away (actuated) from an adjacent disk to create the transducer access spacing therebetween.

Figure 22:
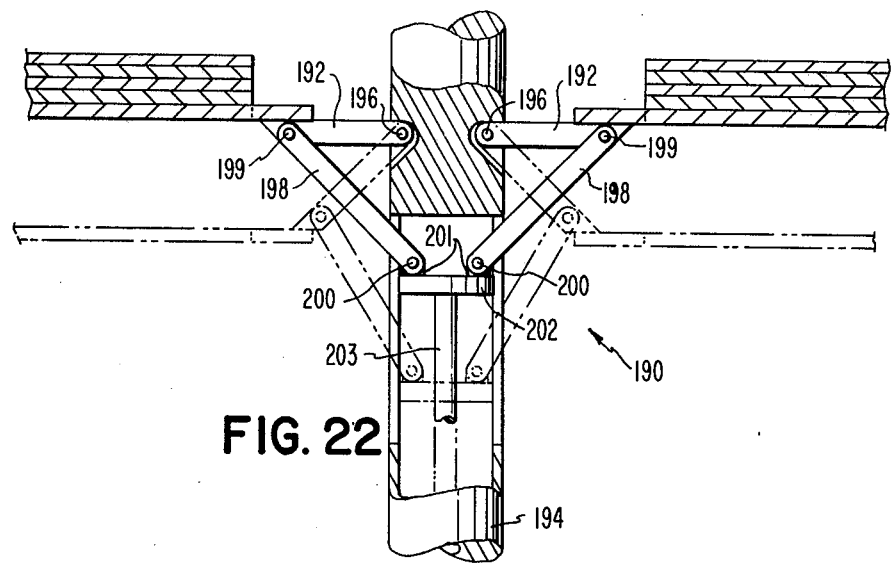
FIG. 22 is a partial side view illustrating another alternate embodiment of a selector having retractable fingers engageable with disk tabs in the disk central aperture.

As shown in FIG. 22, an alternate type of selector 190 can also be utilized having movable rod means or fingers, or ears, 192 In this embodiment, the fingers 192 are retractably mounted on central shaft 194 with each finger 192 being pivoted on pivot pin 196 on central shaft 194. Each shaft is actuated by arm 198 pivoted at one end on finger 192 (by pivot pin 199) and pivoted at the other end (by pivot pin 200) on ears 201 mounted on disk 202 within central shaft 194. Axial movement of disk 202 is controlled by shaft 203 connected at one end to disk 202 and extending therefrom through shaft 194 so that disk 202 and shaft 203 can be axially moved independently of axial movement of central shaft 194. Movement of disk 202 in the direction of fingers 192 (as shown in FIG. 22) will cause the fingers to be extended (as shown by the solid line portion of FIG. 22) while axial movement of disk 202 in the opposite direction will cause the fingers to be retracted (as shown by the dotted line portion of FIG. 22).

As also indicated in FIG. 22, extension of the fingers by axial movement of disk 202 and shaft 203 will cause axial movement (actuation) of the engaged disk to axially move the disk away from an adjacent disk to create a transducer access opening. While not shown, a second group of fingers could be utilized to hold adjacent tabs against movement during axial movement of the selected disks to create a failsafe transducer opening.

Figure 23:
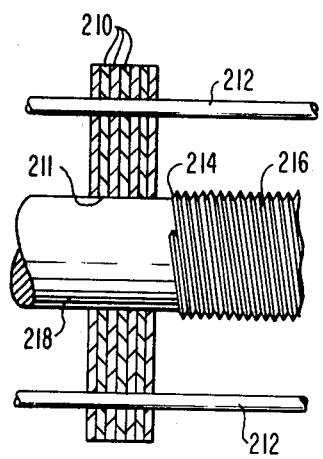
FIGS. 23 and 24 are partial side and top views, respectively, illustrating another alternate embodiment of a selector with disk washers having inwardly directed fingers to engage a threaded shaft for disk actuation.

Further embodiments of the selector, or actuator, are shown in FIGS. 23 through 27. In the embodiment shown in FIG. 23, the disks 210 are single threaded at the central aperture 211 and are maintained aligned by axially extending out disk rotation or alignment pins 212 outwardly of threaded central shaft 214 which is received in the central apertures 211 of the disks. As shown in FIG. 23, shaft 211 includes a threaded engage-disengage actuator 216 on one portion and a minor thread diameter 218 on a second portion, with shaft 214 being rotatable in either the clockwise or counterclockwise directions to achieve engagement or disengagement. Axial motion of the shaft either opens or closes the pack, or stack, of disks at a constant datum.

Figure 24:
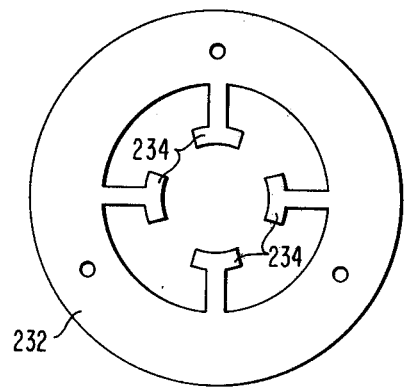
Figure 25:
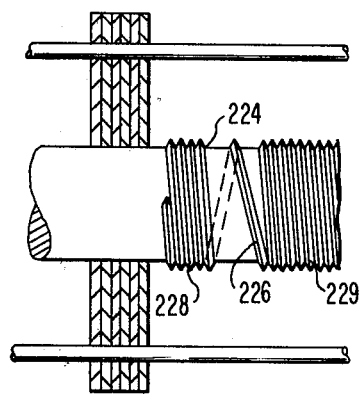
FIGS. 25 through 27 are partial side views of two additional alternate embodiments of selectors showing variable pitch threads on a shaft to create disk spacing.

As shown in FIGS. 24 and 25, central shaft 224 (FIG. 25) can have a large pitch threaded portion 226 with two portions 228 and 229 at the opposite sides thereof each of which has a smaller pitch thread relative to the pitch of threaded portion 226. With this arrangement, a disk washer 232 is preferably utilized with each disk and has flexible fingers 234 extending inwardly into the central aperture area for contact with the threads on shaft 224, as shown in FIG. 24. By use of the varied pitch, the fingers 234 follow the pitch and a rapid axial movement of the disk occurs at the larger pitch area to therefore rapidly create the transducer access opening between disks, which opening will always be at the same axial position.

Figure 26:
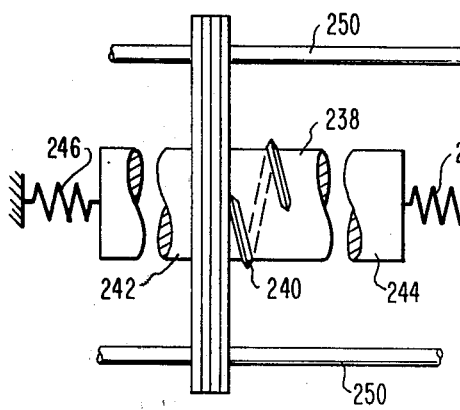
Figure 27:
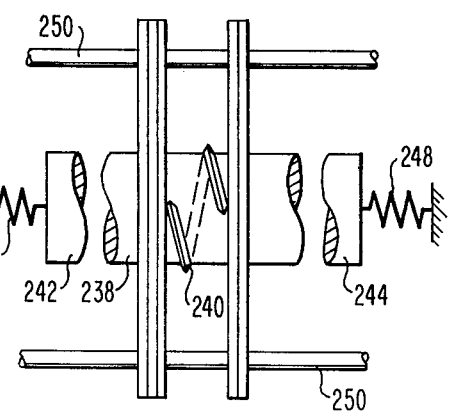

As shown in FIGS. 26 and 27, central shaft 238 may also be utilized with a major threaded portion 240 and minor (or smaller diameter) threaded portions 242 and 244 at opposite sides of the major threaded portion. Shaft 238 is biased in both directions by springs 246 and 248 to maintain the stack of disks adjacent to the major threaded portion 240 at each side thereof. As shown in FIG. 27, as the shaft is rotated, disks are moved from one side of the stack to the other depending on the direction of rotation of the shaft. Circumferential alignment of the disks is maintained by axially-extending alignment pins 250. Transducer access is thus created between the disks separated by the major threaded portion 240 of shaft 238.

The concentricity in a pack, or stack, of disks has been found to be enhanced by use of specialized openings, in the disks for the alignment pins (such as shown, for example, in FIGS. 23, 25, 26 and 27). The specialized openings, as shown in FIGS. 28 through 30, correctly maintain the concentricity of the disks in a stack without requiring dependence on a central locator.

Figure 28:
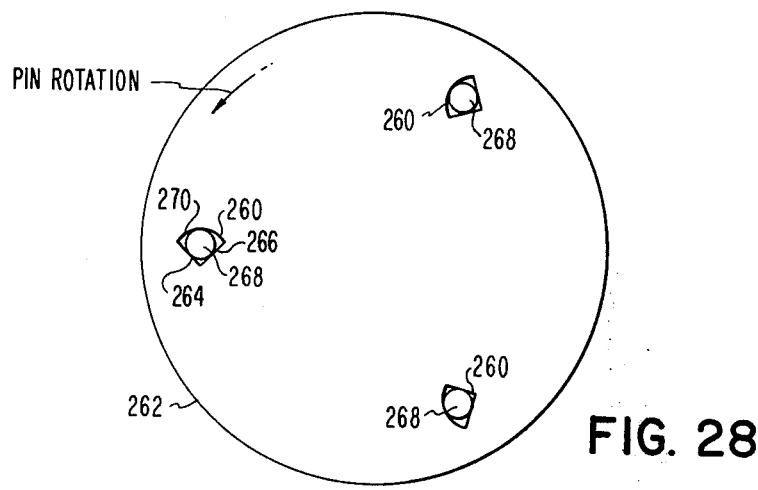
FIG. 28 is a partial top view of a disk with alignment pin openings therein to maintain concentricity of disks in a stack of disks.

As shown in FIG. 28, each of the pin openings 260 of each disk 262 are cut in a V-shaped configuration. As shown best in FIG. 29, the V-shaped configuration is formed by legs 264 and 266 for each of the pins to be utilized. Each pin 268 contacts the legs 264 and 266 of each pin opening 260 along a line on each leg that is equi-distant from the juncture line of the legs which diverge to form an acute angle therebetween. The juncture line of the two legs 264 and 266 falls along the line of the direction of force applied through the center of pins 268 imparting rotation to the disks. This maintains concentricity as the pins rotate as a set in a given direction since the opposing forces created cause the disk to be forced against the legs of the pins. Thus, even if wear occurs as a disk (and/or washer on the disk) slide along the pins, closer nesting results without loss of concentricity.

Figure 29:
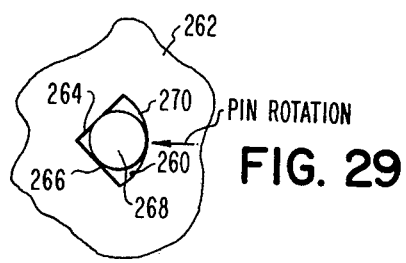
FIG. 29 is a top view of a portion of the disk as shown in FIG. 28 illustrating one of the pin openings therein.
Figure 30:
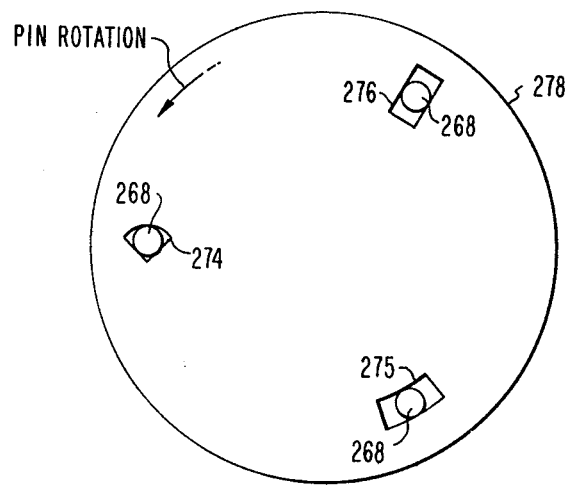
FIG. 30 is a partial top view illustrating a combination of pin openings in a disk for receiving alignment pins.

As shown in FIGS. 28 and 29, the pin openings in disk 260 are formed with the intended direction of pin rotation being counter-clockwise, thus, the opposing force (due to pin inertia and windage drag) is clockwise. While the shape of the third leg 270 of pin opening 260 is shown in FIGS. 28 and 29 as an arc-shaped leg (which is positioned at the rear side, i.e., in the direction of the counter forces), leg 270 may be a planar surface to thus form an opening having a triangular cross-section, if desired.

As can be appreciated from the foregoing, the V-shaped configuration utilized affords a self-centering centerless support. This is due to the use of the substantially triangularly shaped aperture in the disks wherein one of the triangular openings is bisected by a tangential line so that the circular alignment pin, when disposed through the openings of a plurality of disks in a stack, maintains the disks in the desired parallel relationship and supports the disks for rotation by a driving force supplied to the pins and thus imparted to the disks from the pins along a line bisecting the angle in each of the triangular openings. The result is that the disks and pins wear at their engaging surfaces, concentricity about a desired axis of rotation is nevertheless maintained.

FIG. 30 illustrates the use of varied combinations of pin openings 274, 275 and 276 in disk 278. As shown, opening 274 may be an opening as described in connection with the embodiment shown in FIGS. 28 and 29, while opening 275 may have four sides two of which have arcuate configurations and the other two of which have radially extending planar surface configurations. Opening 276, on the other hand, may have a rectangular cross-section with the longer sides being normal to the path of travel of disk 278 and the shorter sides having a length slightly larger than the radius of alignment pint 268. FIG. 30 illustrates that a variety of opening shapes can be utilized with some concentricity maintained by engagement of the pins with the side of the openings in at least two separated locations (with the V-shaped configurations being prefered, however).

As can be appreciated by the foregoing, this invention provides an improved apparatus and method for creating a transducer access opening between rotating disks of a stack of rotating disks.

While the preferred embodiment of the invention has been illustrated and described, it is to be understood that the invention is not limited to the precise constructions herein disclosed and the right is reserved to all changes and modifications coming within the scope of the invention as defined in the appended claims.

What is claimed is:

1. In a storage device having a spindle axially-slideably mounting for rotation a plurality of co-axially positioned, centrally apertured, co-rotating and relatively axially movable disks, an apparatus co-rotatable with and mounting said disks for rotation and for creating an access space between two adjacent rotating disks by axial slideable movement of at least one selected risk relative to an adjacent disk, said apparatus comprising actuator means being axially and rotationally relatively moveable with respect to said co-rotating disks while co-rotating therewith and having at least a plurality of mechanical disk contactors axially aligned with said central apertures, and receivable within said central apertures of said co-rotating disks with said mechanical contactors, upon predetermined movement of said actuator means, being operative to mechanically contact a selected one of said disks adjacent its said central aperture, as determined by the circumferential orientation of said actuator means with respect to said co-rotating disks, to thereby effect axial movement of said selected disk away from an adjacent disk.

2. The apparatus of claim 1 wherein said actuator means includes rotation imparting means for rotating at least said disks and said contactor receivable within said central apertures of said disks so that said contactor co-rotates with said disks.

3. The apparatus of claim 2 wherein said actuator means includes means for rotatively varying said contactor with respect to said disks to thereby circumferentially orient the same for selective engagement of said contactor with said selected disk.

4. The apparatus of claim 1 wherein said contactor of said actuator means includes at least one projection operative to cause said axial movement of said selected disk away from an adjacent disk.

5. The apparatus of claim 4 wherein said disks have projections thereon extending into said central apertures, and wherein said projections on said contactor of said actuator means includes axially extending rod means within said central aperture with axial movement of said rod means causing contact to be made with at least one said projection on a selected one of said disks to thereby cause said axial movement of said selected disk.

6. The apparatus of claim 5 wherein said actuator means includes tumbler means within said central apertures of said disks, said tumbler means being in engagement with selected projections on said disks, and wherein axial movement of said rod means causes engagement of said rod means with said tumbler means to cause axial movement thereof and thereby cause said axial movement of said selected disk.

7. The apparatus of claim 6 wherein each of said disks has a like plurality of projections thereon, wherein said tumbler means includes a plurality of tumblers to separately engage each said projection of each said disk, and wherein said rod means includes a plurality of rods equal to the number of projections on any one of said disks, said rods being circumferentially oriented to axially engage said tumblers engaging said projections of said selected disk to cause said axial movement thereof.

8. The apparatus of claim 7 further a cylinder having a plurality of axially extending bores and disposed within said central apertures and wherein each of said tumblers is separately received in different bores of said cylinder, and said rods being insertable into said bores to cause said axial movement of said tumblers.

9. The apparatus of claim 8 wherein said actuating means includes a plurality of biasing means, and wherein each bore of said cylinder receives a different one of said biasing means for biasing each said tumbler toward engagement with said rods.

10. The apparatus of claim 4 wherein said disks have preselected different offsets at the central portion thereof, and wherein said at least one projection includes a plurality of rods axially movable into said different offsets for engaging a selected one of said disks to cause axial movement thereof with respect to an adjacent disk.

11. The apparatus of claim 10 wherein said rods have different lengths for effecting engagement with a selected disk.

12. The apparatus of claim 10 wherein said rods are radially offset with respect to one another for effecting engagement with a selected disk.

13. The apparatus of claim 10 wherein said rods are angularly offset with respect to one another for effecting engagement with a selected disk.

14. The apparatus of claim 10 wherein said rods are in predetermined groups for effecting engagement with a selected disk.

15. The apparatus of claim 4 wherein said disks have projections thereon extending into said central apertures to form a helix configuration therein, and wherein each said projection on said portion of said actuator means is selectably engagable with a projection on said disk depending upon the orientation of each said projection on said portion of said actuator means with respect to said projections on said disks.

16. The apparatus of claim 15 wherein each of said disks has a plurality of projections extending radially inwardly therefrom with each said projection being in a different one of each of a plurality of groups of projections forming a plurality of partial helices within said central aperture of said disks, and wherein said portion of said actuator means includes a plurality of projections equal in numbers to the projections on any one disk whereby each projection on said portion engages that projection of each of said groups associated with a selected disk to cause said axial movement of said selected disk.

17. The apparatus of claim 4 wherein said projections on said portion of said actuator means includes at least one retractable finger that is engagable with a selected disk when extended.

18. The apparatus of claim 17 wherein said disks include a plurality of inwardly projecting tabs at said central apertures, and wherein said portion includes a plurality of retractable fingers engagable with said tabs of a selected disk when said fingers are extended.

19. The apparatus of claim 17 wherein said actuator means includes finger actuator means for controlling extension of said fingers.

20. The apparatus of claim 4 wherein said projections on said portion of said actuator means includes threads on a central shaft received within said central apertures, said threads engaging said disks to cause axial movement of a selected disk with respect to an adjacent disk.

21. The apparatus of claim 20 wherein said disks have washers thereon, said washers having inwardly directed fingers engaging said threads on said central shaft.

22. The apparatus of claim 20 wherein said threads on said shaft includes at least one portion of greater pitch than an adjacent portion whereby rapid axial movement of an engaged disk is effected.

23. The apparatus of claim 4 wherein each said disk is flexible and has a washer attached at the central portion thereof, said washer being more rigid than said disk, with said washer attached to said selected disk being axially moved to effect said axial movement of said selected disk.

24. The apparatus of claim 1 wherein said apparatus includes latching means adjacent to and engagable with said actuator means to effect locking of said portion of said actuator means when in a position causing creation of an access opening between adjacent disks to prevent closing of said access opening while locked.

25. The apparatus of claim 24 wherein said portion includes notched rod means, and wherein said latching means includes a latch member engagable with the notch in said rod means to maintain the positioning of said rod means when said rod means is positioned to create an access opening between adjacent disks.

26. The apparatus of claim 25 wherein said notched rod means includes a plurality of rods each having at least one notch thereon, and wherein said latch means includes a like plurality of latches engagable with the notches of different ones of said rods.

27. The apparatus of claim 25 wherein said notched rod means includes a plurality of rods each having at least two notches thereon, and wherein said latch means includes a latch plate having a plurality of apertures therein equal in number to said rods for engaging one of said notches in different ones of said rods to latch said rods in one of two operating positions depending upon the notch then engaged by said latch plate.

28. The apparatus of claim 25 wherein said latch plate includes a pawl cooperable with said latch means for controlling movement thereof.

29. The apparatus of claim 1 wherein each of said disks has apertures therein for receiving alignment pins extending through said plurality of disks, said apertures of each of said disks being formed by sidewalls configured to preserve the concentricity of said disks.

30. The apparatus of claim 29 wherein said sidewalls of said apertures include at least two walls forming a V-shape wherein said pin received within said apertures is at least in engagement with both of said two walls whereby wear due to contact therebetween results in no loss of concentricity.

31. The apparatus of claim 30 wherein said sidewalls of said apparatus form a triangularly-shaped aperture.

32. An apparatus for creating an access space between adjacent disks of a group of coaxially positioned and centrally apertured interfacing disks in a storage device, said apparatus comprising:
   engaging means having a disk contractor receivable within said central apertures of said disks with said disk contractor, upon predetermined axial movement of said engaging means, operatively engaging at least a selected one of said disks as determined by the circumferential orientation of said engaging means with respect to said disks;
   drive means for causing co-rotation of at least said disks and said engaging means;
   selector means for controlling said circumferential orientation of said rotating engaging means with respect to said co-rotating disks during said co-rotation; and
   actuating means operative during said co-rotation for causing said predetermined axial movement of said engaging means to thereby cause axial movement of said selected rotating disk away from an adjacent disk while said disks and actuating means are co-rotating.

33. The apparatus of claim 32 wherein said drive means also causes co-rotation of said selector means and said actuating means along with said disks and said engaging means.

34. The apparatus of claim 32 wherein said engaging means includes at least one substantially axially aligned pin in said disk contractor such that the axial movement thereof causes axial movement of a disk operatively engaged by said disk contractor.

35. The apparatus of claim 34 wherein said apparatus includes a bored cylinder within said central apertures of said disks, wherein said selected disks include a portion in said bore of said cylinder, wherein said disk contacting portion of said engaging means includes a tumbler within said bore of said cylinder, and wherein said pin engages said tumbler to cause axial movement of said selected disk in engagement with said tumbler.

36. The apparatus of claim 35 wherein said cylinder has a plurality of bores therein, wherein each of said disks includes a plurality of tabs extending into a plurality of different ones of said bores to thereby establish distinct groups of bores each of which distinct groups receives the tabs of only one disk therein, wherein said disk contacting portion of said engaging means includes a tumbler wherein each of said bores, with each said tumbler engaging each said disk tab within said bore, wherein said engaging means includes a plurality of axially aligned pins equal in number to the number of said plurality of tabs on said disks, said pins being spaced from one another and receivable within different ones of said distinct groups of bores in said cylinder, and wherein said engaging means includes biasing means within each said bore for biasing each said tumbler toward contact with said pins.

37. The apparatus of claim 34 wherein said engaging means includes a plurality of axially aligned and spaced pins, wherein said disks include a plurality of axially aligned openings in each of said disks except for a selected disk to be engaged by at least one of said pins when said pins are axially moved into said aligned openings in said disks whereby said selected disk is axially moved to create said access space between adjacent disks.

38. The apparatus of claim 32 wherein said disks have inwardly directed tabs extending into said central apertures with said tabs being angularly offset with respect to one another to thereby provide a helical configuration of tabs within said central apertures, wherein said disk contacting portion of said engaging means includes a contactor with outwardly directed tabs thereon engagable with said tabs on said disks, and wherein said selector means controls the orientation of said contactor to determine said tabs brought into contact with one another.

39. The apparatus of claim 32 wherein said engaging means includes support means having at least one finger pivotally mounted thereon, said finger being movable between a retracted position free of contact with said disks and an extended position in contact with a selected disk, and said engaging means also including control means for controlling pivoting of said finger between said retracted and extended positions.

40. The apparatus of claim 39 wherein said support means has a plurality of fingers pivoted thereon for contact with at least one disk at spaced portions thereof, and wherein said control means controls movement of all of said fingers for movement in unison with one another.

41. The apparatus of claim 32 wherein said engaging means has a shaft with threads thereon, said threads contacting said disk to cause axial movement of a selected disk with respect to an adjacent disk.

42. The apparatus of claim 41 wherein said shaft has at least one portion with a large pitch sufficient to cause rapid axial movement of a selected disk to thereby cause rapid parting between disks.

43. The apparatus of claim 32 wherein each of said disks is a flexible disk, and wherein each of said flexible disks has a rigid washer attached thereto at said central aperture portion whereby said washer engages said disk contacting portion of said engaging means to cause axial movement of said disk.

44. The apparatus of claim 32 wherein said apparatus includes latching means operatively connected with said engaging means to prevent closing of an established opening between adjacent disks when said latching means is moved to a latched position by preventing withdrawal of said engaging means from engagement with a disk that has been axially moved away from an adjacent disk.

45. An apparatus for creating an access space between two adjacent disks of a group of centrally apertured disks each of which disks has at least one tab thereon extending into the central aperture, said apparatus comprising:

a cylindrical element having a plurality of axially extending notches therein spaced along the outer surface of said cylinder, said cylindrical element having a radius slightly less than the radius of the central apertures of a group of disks to be received thereon with the tabs of the disks received in different notches in said cylinder then so received on said cylinder;

a tumbler element within each of said notches of said cylinder with each said tumbler element being engaged with one side of said tab of said disk when said disks are received on said cylinder with each of said tabs in different notches of said cylinder;

a biasing element within each of said notches of said cylinder with each said biasing element being engaged with the other side of said tabs when said tabs are received in said cylinder with each of said tabs in different notches of said cylinder, said biasing element biasing said tabs towards said tumblers; and a selector element having at least one pin thereon selectively insertable into said notches in said cylinder to contact said tumbler therein for causing axial movement of said tumbler and a disk having said tab engaged therewith whereby said axial movement causes said disk to be axially moved away from an adjacent disk.

46. The apparatus of claim 45 wherein said cylindrical element is mounted on a shaft for common rotation of said disks, and wherein said selector element is mounted for common rotation with said cylindrical element.

47. The apparatus of claim 45 wherein each of said disks received on said cylinder has a plurality of spaced tabs each of which extends into said central apertures and are received in different notches in said cylinder when said disks are positioned on said cylinder so that when so positioned each group of tabs is received in different groups of notches with the number of groups of notches in said cylinder being equal to the number of disks received on said cylinder, and wherein said selector element has a plurality of pins therein equal in number to the number of spaced tabs on each of said disks received in said cylinder, said pins being mounted on said selector element so that said pins are inserted only in a desired one of said group of notches for imparting axial movement to a selected disk.

48. The apparatus of claim 47 wherein said selector means is rotatable and axially movable with respect to said cylinder, and wherein said apparatus includes control means for controlling both the rotation and axial movement of said selector means whereby selection and axial movement of a disk received on such cylinder can be effected to create an access opening between adjacent disks.

49. The apparatus of claim 48 wherein said control means includes orienting means for controlling the rotation of said selector element for selecting said disk to be axially moved by aligning said pins with a particular group of notches in said cylinder.

50. The apparatus of claim 48 wherein said control means includes actuator means for controlling axial movement of said selector element to cause said selected disk to be axially moved by axially moving said tumblers in said cylinder in engagement with the tabs on said selected disk in said notches.

51. A method for mechanically creating an access opening between adjacent disks of a co-rotating stack of coaxially and closely positioned, selectively axially movable centrally apertured disks, by an axially movable mechanical disk contactor, said method comprising:
   selecting, while said disks are co-rotating, for accessing one of said rotating disks of said co-rotating stack of disks;
   contacting said selected and co-rotating disk with said disk contactor at the central aperture portion thereof; and
   axially moving said contacted disk by imparting an axially directed force thereto via said disk contactor at said central aperture portion while maintaining co-rotation of said stack of disks to thereby create an access opening between said contacted disk and an adjacent disk.

52. The method in claim 51 wherein said disk contractor has a first plurality of circumferentially spaced-apart contacter pins and said method includes contacting said selected disk at said first plurality of points at the central aperture portion of said disk by said contractor pins to axially move said disk away from said adjacent disk.

53. The method in claim 51 wherein said method includes providing a plurality of circumferentially displaced engagement tabs on said rotating disks at said central aperture portions, and wherein imparting of said axially directed force is effected by axially-directed mechanical contact by said disk contacter with said engagement tab of said selected disk at said central aperature of said disk to be axially moved.

54. The method of claim 53 wherein said method includes circumferentially orienting said disk contractor so that said axially-directed contact is made only with said tab of said selected disk for effecting said axial movement thereof.

55. The method of claim 54 wherein said method includes arranging said tabs of said disks in a circular configuration, and wherein said method also includes providing a rotatable selector and rotating said selector prior to engagement with said tab of said selected disk so that contact is made only with said tab of a disk selected to be axially moved.

56. The method of claim 54 wherein said method includes spacing said tabs with said central aperture to form a helix configuration, and wherein said method also includes rotating said selector to engage only said tab of said disk selected to be axially moved.

57. The method of claim 51 wherein said method includes providing a selector having retractable fingers for engaging a selected disk to be axially moved, and causing said fingers to be extended to move said selected disk axially.

58. The method of claim 51 wherein said method includes providing a selector having threads on a shaft, further including the steps of causing said threads to engage a selected disk, and rotating said shaft to cause said selected disk to be axially moved.

59. The method of claim 58 wherein said method includes providing a section of large pitch on said shaft, and rotating said shaft with a selected disk in engagement with said large pitch section thereof to cause rapid axial movement of said selected disk away from an adjacent disk.

60. The method of claim 51 wherein said method includes preventing axial movement between two disks having said access opening then established therebetween to preclude premature closing of said access opening.

61. The method of claim 60 wherein said method includes providing disk engagement means for causing axial movement of a selected disk, and latching said disk engagement means to prevent movement thereof to preclude closing of said access opening.

62. The method of claim 61 wherein said method includes maintaining the concentricity of said stack of disks despite wear between contacting surfaces imparting rotational drive to said disks.

* * * * *